(12) United States Patent
Woodland et al.

(10) Patent No.: US 7,478,589 B2
(45) Date of Patent: Jan. 20, 2009

(54) SEAR BAR FOR GRILL

(75) Inventors: Peter Woodland, Chester Hill (AU); Wahib Salib, Chester Hill (AU)

(73) Assignee: Woodland Home Products Pty Limited, New South Wales (AU)

( * ) Notice: Subject to any disclaimer, the term of this patent is extended or adjusted under 35 U.S.C. 154(b) by 644 days.

(21) Appl. No.: 11/137,956

(22) Filed: May 26, 2005

(65) Prior Publication Data
US 2005/0263009 A1 Dec. 1, 2005

(30) Foreign Application Priority Data
May 26, 2004 (AU) .............................. 2004902809

(51) Int. Cl.
*A47J 37/07* (2006.01)
*F24B 5/08* (2006.01)

(52) U.S. Cl. ........................................ 99/447; 126/1 R

(58) Field of Classification Search ................... 99/401, 99/422, 444–447; 126/1 R, 41 R, 39 H, 39 N, 126/39 K; 219/450.1, 524
See application file for complete search history.

(56) References Cited

U.S. PATENT DOCUMENTS

| 4,677,964 A | | 7/1987 | Lohmeyer et al. |
| 4,727,853 A | | 3/1988 | Stephen et al. |
| D446,683 S | * | 8/2001 | Pai ............................. D7/402 |
| 6,283,114 B1 | * | 9/2001 | Giebel et al. ............. 126/41 R |

* cited by examiner

*Primary Examiner*—Sang Y Paik
(74) *Attorney, Agent, or Firm*—McCarter & English, LLP

(57) ABSTRACT

A sear bar for evaporating greases in a grill, the sear bar comprising an inverted V-shaped member, said inverted V-shaped member including an apex and two free ends, wherein said apex is situated on the upper portion of the sear bar and wherein said free ends are directed inwardly so as to define a lower portion of the sear bar.

10 Claims, 4 Drawing Sheets

SEAR BAR FOR GRILL

TECHNICAL FIELD

The present invention relates to a sear bar for evaporating greases in a grill. In particular, the sear bar is suitable for grills used in barbecues.

BACKGROUND OF THE INVENTION

Gas grills have become very prominent in outdoor cooking and barbecuing. Generally, a gas grill will include a cooking vessel containing one or more gas burners and a cooking plate or grill situated above the burners to support the food during cooking. In order to evenly distribute heat generated by the gas burners, lava rock has commonly been placed between the gas burners and the cooking plate or grill.

Lava rock is a porous heat absorbing material and absorbs and spreads the heat from the gas burners to provide a more even distribution of heat to the cooking grill or plate above. The lava rock is generally supported above the burners by a grid structure.

Unfortunately, greases dripping from the food being cooked on the cooking grill tend to drip onto the lava rock and ignite. The resultant flare-ups can be dangerous and can burn the food being cooked. Further, lava rock is porous and therefore absorbs the greases, which drip from the food. As a result, the lava rock is very hard to clean. Finally, because lava rock absorbs heat, the time for heating up the lava rock is lengthy and after the gas burners have been turned off the lava rock stays hot for a long period of time.

In solving the problems with use of lava rock in gas grills, it is known to provide a generally inverted V-shaped member, known as a sear bar, positioned above the gas burners. U.S. Pat. No. 4,727,853 (Stephen et al) and U.S. Pat. No. 4,677,964 (Lohmeyer et al) disclose the use of a plurality of inverted V-shaped members positioned above the gas burners. The plurality of V-shaped members mean that the greases dripping from the food being cooked fall onto the V-shaped members and are evaporated without uncontrolled flare-ups during cooking. U.S. Pat. No. 4,677,964 discloses the use of a second set of inverted V-shaped members positioned transversely to the first set of inverted V-shaped members. This further minimizes flare-ups, but creates a bulky sear bar arrangement.

It is an object of the invention to provide a sear bar which will overcome or substantially ameliorate at least of the deficiencies of the prior art, or to least provide an alternative.

SUMMARY OF THE INVENTION

According to a first aspect of the present invention there is provided a sear bar for evaporating greases in a grill, the sear bar comprising an inverted V-shaped member, said inverted V-shaped member including an apex and two free ends, wherein said apex is situated on the upper portion of the sear bar and wherein said free ends are directed inwardly so as to define a lower portion of the sear bar.

Preferably the lower portion is spaced apart from the upper portion so as to define a channel between the lower portion and the upper portion. Preferably the lower portion of the sear bar is substantially parallel to the upper portion of the sear bar.

Preferably the inverted V-shaped member is composed of a heat conductive material, the heat conductive material being metal or metal coated in porcelain.

Preferably the elongated inverted V-shaped member further comprises slits in both the upper portion and the lower portion of the sear bar.

Preferably the sear bar comprises one piece.
Preferably the sear bar is symmetrical about the apex.
Preferably the inverted V-shaped member includes tabs.

According to a second aspect of the present invention there is provided a sear bar for evaporating greases in a grill, the sear bar comprising an elongated heat conductive member, the member having a longitudinally extending apex disposed in an upper portion of the member and two free ends directed inwardly to define a lower portion of the member, the lower portion being spaced apart from the upper portion to define a channel between the upper portion and the lower portion, the upper portion having a substantially inverted v-shape.

BRIEF DESCRIPTION OF THE DRAWINGS

A preferred embodiment of the invention will now be described by way of example only, with reference to accompanying drawings in which.

DETAILED DESCRIPTION

Figure 1:
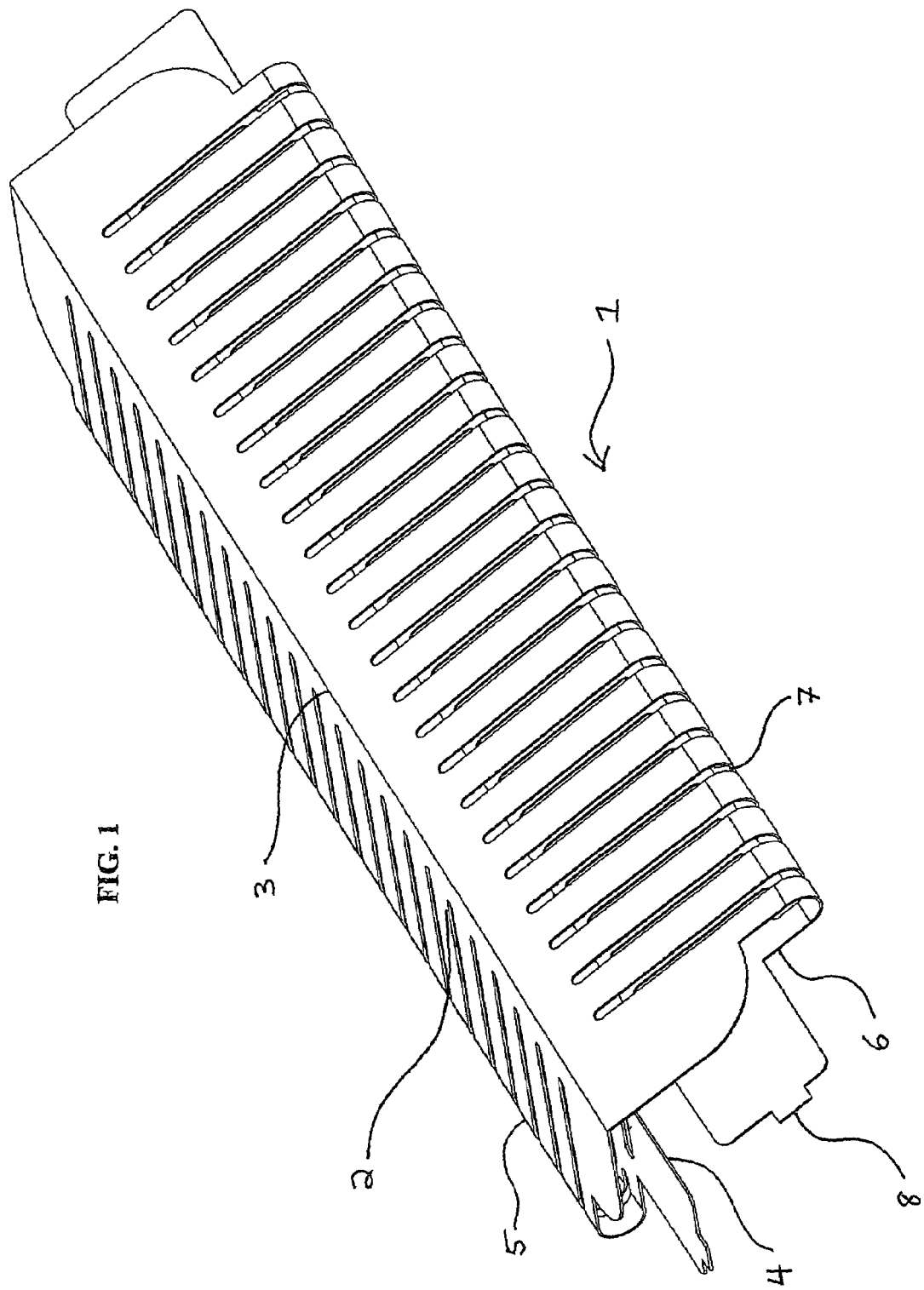
FIG. 1 is a perspective view of the sear bar in accordance with the preferred embodiment.
Figure 2:
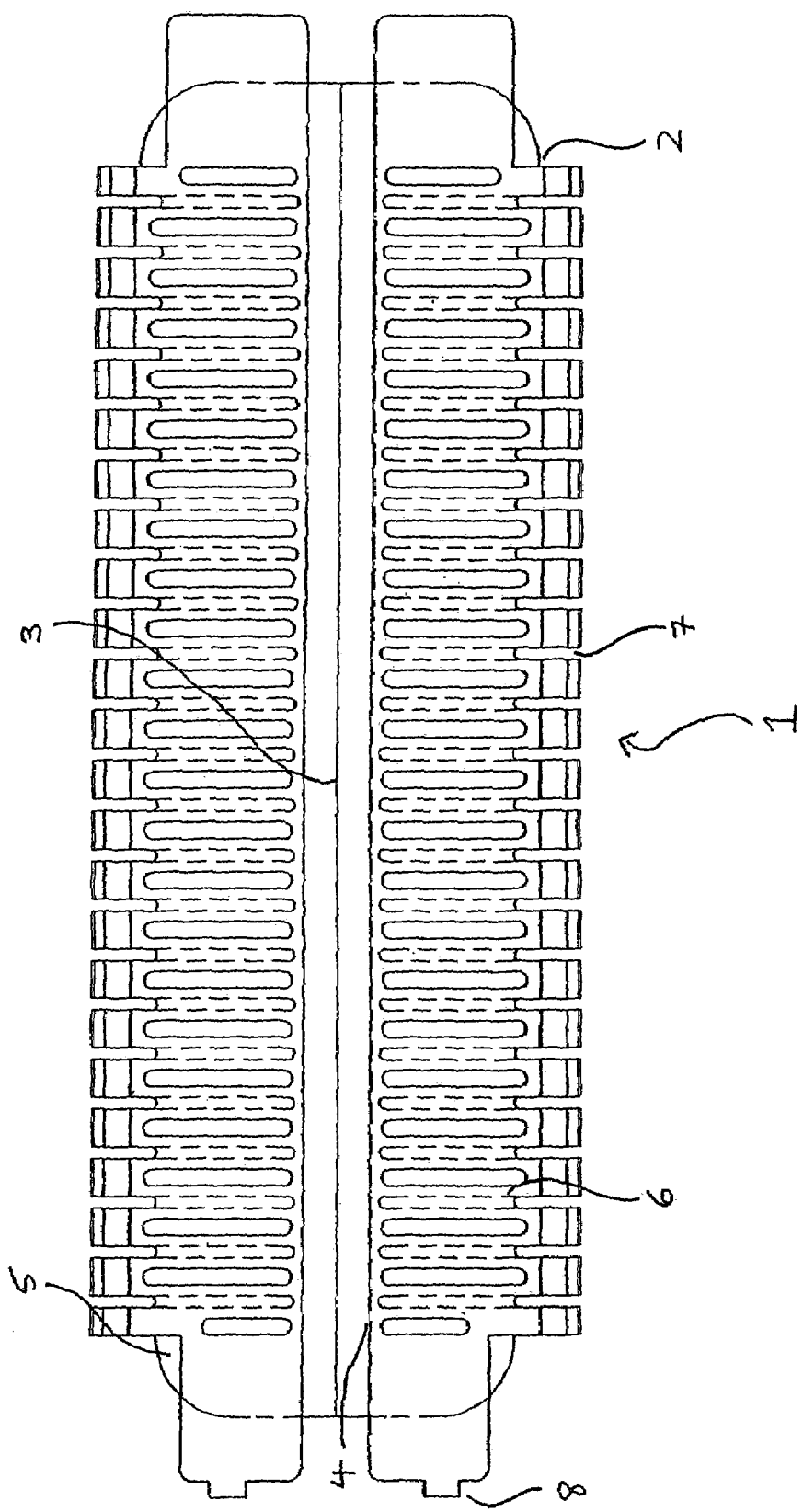
FIG. 2 is a bottom view of the sear bar in accordance with the preferred embodiment.
Figure 3:
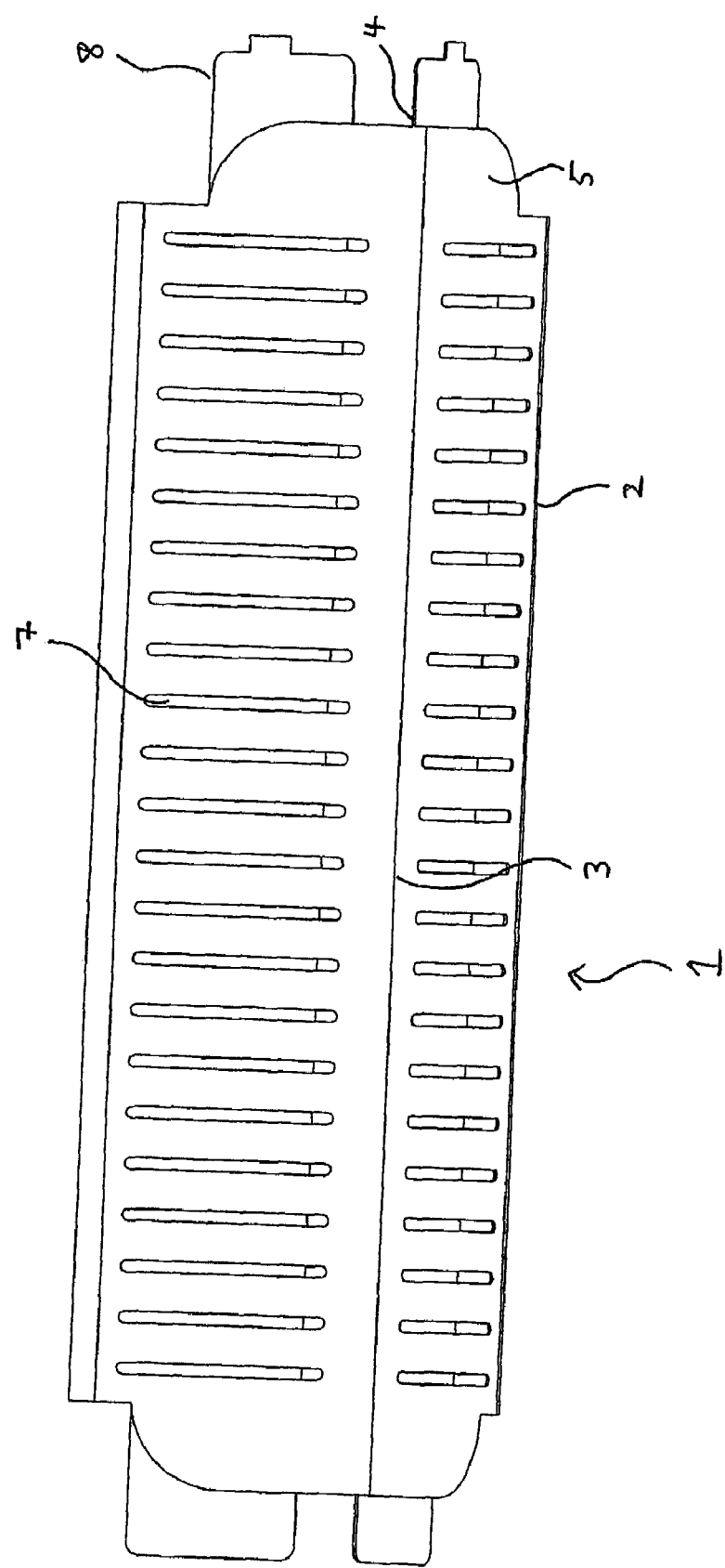
FIG. 3 is a top perspective view of the sear bar in accordance with the preferred embodiment.
Figure 4:
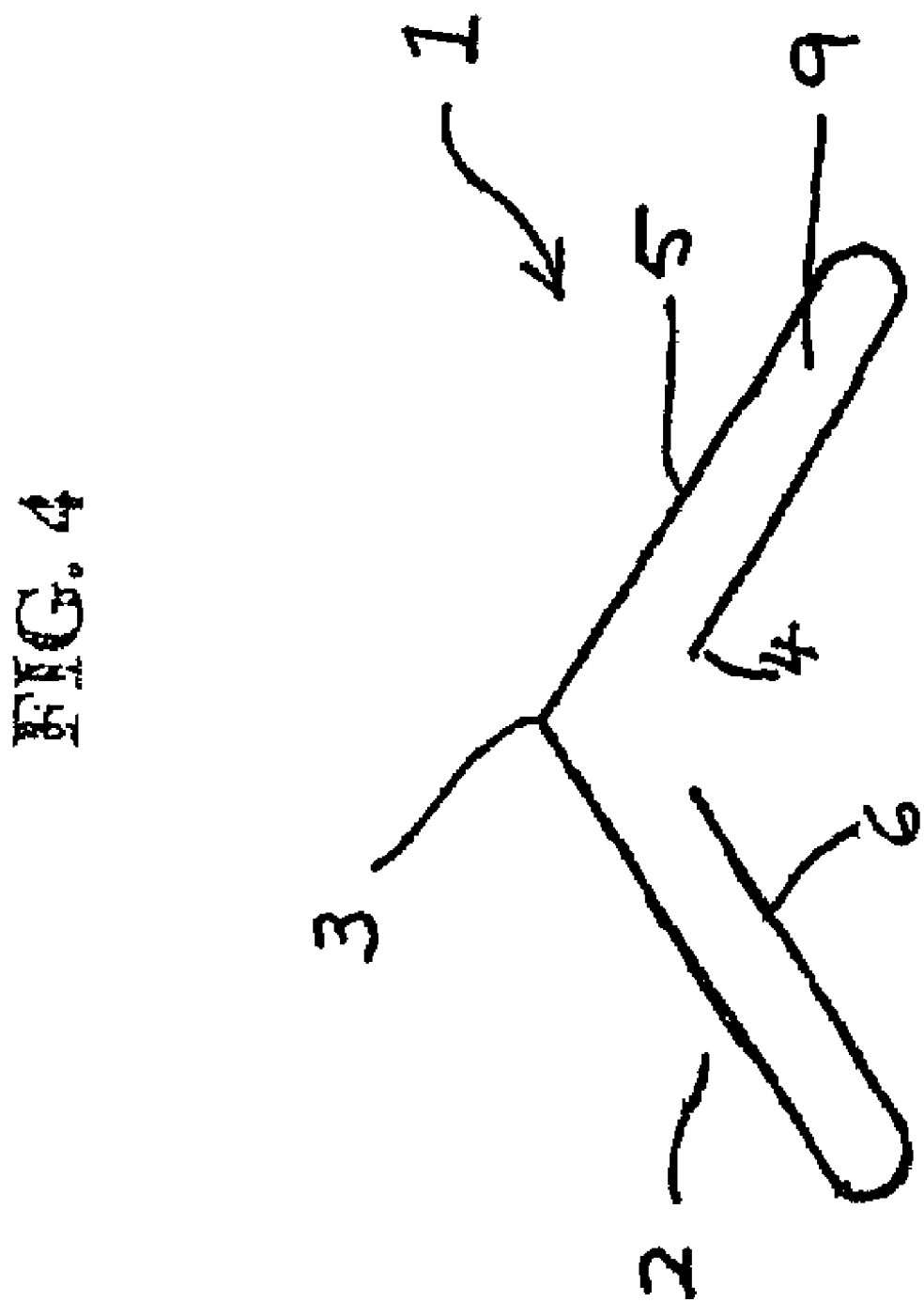
FIG. 4 is a reduced end view of the sear bar in accordance with the preferred embodiment.

Referring to FIGS. 1 to 4, there is shown a sear bar 1 for a gas grill (not illustrated). The sear bar 1 comprises an elongate member 2. The elongate member 2 is composed of single piece of a heat conductive material. The heat conductive material is preferably a thin sheet of metal or a thin sheet of metal coated in porcelain. It can be seen that a porcelain coating allows the sear bar to be easily cleaned. The member generally comprises an inverted v-shape.

The member 2 includes an apex 3 and two free ends 4, the free ends 4 being the unconnected tips of the elongate member 2. The apex 3 is situated on an upper portion 5 of the sear bar and extends longitudinally along the member.

The free ends 4 are directed inwardly so as to define a lower portion 6 of the sear bar 1. The lower portion 6 is spaced apart from the upper portion 5 so as to define a channel 9 between the lower portion 6 and the upper portion 5. The lower portion 6 of the sear bar 1 is substantially parallel to the upper portion 5 of the sear bar 1.

The sear bar 1 further includes slits 7. The slits 7 are incorporated into both the upper portion 5 and the lower portion 6 of the sear bar 1. The slits 7 preferably run transversely to the length of the inverted V-shaped member. The slits 7 are evenly spaced along the length of the member 2. It can be seen that the slits 7 allow for direct heat to reach the food being cooked.

The sear bar 1 also includes tabs 8, which are adapted so that the sear bar 1 can be easily positioned over the gas burners (not illustrated) in the gas grill (not illustrated). In use a plurality of sear bars 1 are placed within the gas grill such that each sear bar 1 is positioned above a respective gas burner.

In tests the sear bar 1 of the present invention minimizes flare ups more effectively than does the conventional single layered inverted v-shaped sear bar of the prior art. The sear bar of the present invention minimizes flare-ups while being more compact than a double-layered sear bar arrangement and thus can be utilised in compact barbecues for patio or balcony use.

The term "comprising" (and its grammatical variations) as used herein is used in the inclusive sense of "having" or "including" and not in the exclusive sense "consisting only of".

The invention claimed is:

1. A sear bar for evaporating greases in a grill, the sear bar comprising an inverted V-shaped member, said inverted V-shaped member including an apex and two free ends, wherein said apex is situated on the upper portion of the sear bar and wherein said free ends are directed inwardly so as to define a lower portion of the sear bar, and wherein the lower portion of the sear bar is substantially parallel to the upper portion of the sear bar.

2. A sear bar as claimed in claim 1, wherein the lower portion is spaced apart from the upper portion so as to define a channel between the lower portion and the upper portion.

3. A sear bar as claimed in claim 1, wherein the inverted V-shaped member is composed of a heat conductive material.

4. A sear bar as claimed in claim 3, wherein the heat conductive material is metal.

5. A sear bar as claimed in claim 1, wherein the elongated inverted V-shaped member further comprises slits.

6. A sear bar as claimed in claim 5, wherein the slits are in both the upper portion and the lower portion.

7. A sear bar as claimed in claim 6, wherein the sear bar is composed of one piece.

8. A sear bar as claimed in claim 1, wherein the sear bar is symmetrical about the apex.

9. A sear bar as claimed in claim 1, wherein the inverted V-shaped member includes tabs.

10. A sear bar for evaporating greases in a grill, the sear bar comprising an elongated heat conductive member, the member having a longitudinally extending apex disposed in an upper portion of the member and two free ends directed inwardly to define a lower portion of the member, the lower portion being spaced apart from the upper portion to define a channel between the upper portion and the lower portion, the upper portion having a substantially inverted v-shape, and the lower portion is substantially parallel to the upper portion of the sear bar.

* * * * *